United States Patent

Wagner

[11] Patent Number: 5,906,478
[45] Date of Patent: May 25, 1999

[54] ABSORBING BELT PUMPING DEVICE

[76] Inventor: Wesley L. Wagner, P.O. Box 3106, N. Myrtle Beach, S.C. 29582

[21] Appl. No.: 08/868,246

[22] Filed: Jun. 3, 1997

[51] Int. Cl.⁶ ..................................................... F04D 19/14
[52] U.S. Cl. ........................................ 417/320; 417/410.1
[58] Field of Search .................................. 417/320, 410.1

[56] References Cited

U.S. PATENT DOCUMENTS

| | | | |
|---|---|---|---|
| 831,448 | 9/1906 | Leinweber | 198/116 |
| 930,465 | 8/1909 | Fowler | 103/72 |
| 1,007,282 | 10/1911 | Hawley | 103/72 |
| 1,703,963 | 3/1929 | Scruby | 103/72 |
| 2,289,706 | 7/1942 | Hay et al. | 103/72 |
| 2,866,827 | 12/1958 | Jurgeleit et al. | 260/637 |
| 2,881,127 | 4/1959 | Hetzel | 208/26 |
| 3,314,540 | 4/1967 | Lane | 210/77 |
| 3,487,927 | 1/1970 | Yahnke | 210/30 |
| 3,508,663 | 4/1970 | Brill | 210/396 |
| 3,539,013 | 11/1970 | Smith | 210/242 |
| 3,617,552 | 11/1971 | Will | 210/23 |
| 3,679,058 | 7/1972 | Smith | 210/242 |
| 3,695,451 | 10/1972 | Schmidt, Jr. et al. | 210/526 |
| 3,709,369 | 1/1973 | Brill et al. | 210/400 |
| 3,764,016 | 10/1973 | Sewell et al. | 210/400 |
| 3,774,685 | 11/1973 | Rhodes | 166/314 |
| 4,052,313 | 10/1977 | Rolls | 210/242 |
| 4,089,784 | 5/1978 | Ettelt et al. | 210/526 |
| 4,154,683 | 5/1979 | Timmer et al. | 210/238 |
| 4,274,957 | 6/1981 | Koller | 210/172 |
| 4,582,604 | 4/1986 | Bashaw | 210/396 |
| 5,016,708 | 5/1991 | Baer et al. | 166/75.1 |
| 5,080,781 | 1/1992 | Evins, IV | 210/112 |

FOREIGN PATENT DOCUMENTS

| | | | |
|---|---|---|---|
| 586207 | 3/1925 | France | 417/320 |
| 605471 | 5/1926 | France | 417/320 |
| 193931 | 1/1966 | U.S.S.R. | 417/320 |

*Primary Examiner*—Charles G. Freay
*Attorney, Agent, or Firm*—Michael E. Mauney

[57] ABSTRACT

A belt pumping device using an endless belt driven between two perforated drums. One drum is submerged in a liquid to be pumped with the other drum positioned outside of the liquid to be pumped. At least a portion of the endless belt is constructed of absorbing material. The belt passes over the drum submerged in the liquid and the belt absorbs the liquid, which is then expressed from the belt on the other drum and collected in a collection pan for transportation to another location.

20 Claims, 4 Drawing Sheets

ABSORBING BELT PUMPING DEVICE

FIELD OF THE INVENTION

This invention relates to a pumping device having an endless belt driven between at least two drums. One drum is at least partially submerged in a liquid to be pumped. The other drum is outside of the liquid to be pumped and the endless belt rotates between the two drums. The endless belt is constructed of materials that will absorb the liquid to be pumped. The belt passes over the drum that is at least partially submerged within the liquid and the belt absorbs the liquid. The liquid is then expressed from the absorbing material on the belt by the other drum which is placed outside of the liquid.

BACKGROUND OF THE INVENTION

A variety of technologies have been employed for pumping liquids from one location to another. The most commonly used are mechanical devices. The mechanical pumps broadly fall into two categories, centrifugal pumps and displacement pumps. Centrifugal pumps employ the centrifugal force created by rotary motion to move water from one location to another. Typically, these pumps must be primed. They ordinarily do not operate well with fluids that have high viscosity. At higher speeds, cavitation effects may develop which destroy the efficiency of the pump. Additionally, these pumps require their moving parts to fit with reasonably close tolerances. If the tolerances are too large, so that there is backflow or leakage of the fluid around the driving moving parts, then there is loss of efficiency of the pump or the pump might stop operating altogether.

Displacement pumps take a variety of forms, including reciprocating pistons or rotary devices. Not all forms of these pumps require priming and certain forms of these pumps can operate, at least at low speeds, with liquids having a high degree of viscosity. Ordinarily, the inlets of these pumps must be submerged completely within the liquid to be pumped or the pump will not operate at acceptable efficiency or operate at all. Additionally, displacement rotary pumps require very close tolerances to effectively operate. The displacement reciprocating piston pumps do not require tolerances as close as the rotary pumps, but reasonably close tolerances are required if the reciprocating pump is to operate at expected efficiencies.

These types of mechanical pumps are particularly subject to fouling by suspended particles or solid matter in the liquid to be pumped. Any kind of floating debris that is pulled into the pump inlet can foul or destroy the pump. For these reasons, these pumps ordinarily require some degree of attention from an operator. This is especially true where water levels may rise and fall or where the condition of the liquid to be pumped varies widely.

Endless belts or hose like collectors have been employed in specialized applications usually involving high viscosity hydrocarbons. Here, an endless belt or tube rotates on the surface of a liquid usually contaminated by hydrocarbons. The hydrocarbon materials, which are floating on the surface of water, adhere to the belt as the belt moves out off the surface of the liquid containing the high viscosity hydrocarbons. The belt moves to a collector where the belt is scraped to remove the hydrocarbons adhering to the surface of the belt, which are then collected for subsequent disposal. The belt, after being scraped, returns to the water to begin the process over again. An example of this type of technology is seen in U.S. Pat. No. 3,508,663, issued to Brill on Aug. 28, 1970. Similar technology is seen in U.S. Pat. No. 3,617,552, issued to Will and Grutsch on Nov. 2, 1971, which uses a revolving polyurethane foam belt to collect both water and hydrocarbons. The belt is squeezed twice to first remove the water and then again to remove the hydrocarbons. U.S. Pat. No. 5,080,781, issued to Evins on Jun. 14, 1992 discloses an endless absorption belt which collects low viscosity hydrocarbons from a well. This invention is ordinarily placed into a well bore so that the hydrocarbons are first removed from the water then pumped to the surface where they are collected for use. The above devices have been designed primarily for removal of hydrocarbons and separating them from water. Their applications are usually in pollution clean ups, hydrocarbons monitoring wells, and the like.

There are many application where no conventional pump technology meets all of the needs of the applications. In agricultural applications, frequently muddy water or water with particulate matter must be pumped. The degree of particulate matter suspended in the water may vary widely from time to time. Additionally, bits of debris, small fish or other aquatic life may also be present in the water. This type of foreign material can easily foul or destroy conventional mechanical pumps. Additionally, the water level may vary widely. The close mechanical tolerances required by many pump types require that the fluid pumped be relatively free of foreign bodies or other material that may affect the required tolerances. It may be inappropriate to pump when a water level is below a certain level. While floats and other sensors may be employed to control the pump, these sensors are subject to fouling or malfunction. In many types of mechanical pumps if the inlet is exposed to air, the pump will cease operating and will not operate again until the pump is again primed. Therefore, if the water level falls below the inlet while the pump is operating, the pump cannot operate again without operator intervention. Thus, a self-priming pump is a desirable feature. In agricultural applications and in environmental wastewater management applications, it may be desirable not only to move water from one place to another, but also to aerate the water that is being pumped as well as the water that is located within the vicinity of the pump inlet. A pump that aerates the liquid pumped as well as aerates around the pump inlet is desirable in many applications.

Consequently, it would be an advance in the technology to devise an endless belt pump that could not only pump high and low viscosity hydrocarbons, but also pump water. The pumping device should be mechanically simple. It should require no close tolerances and a minimum of moving parts. It should be resistent to fouling from particulate matter or other foreign bodies in the liquid pumped. The pump should operate without priming. Exposing the pump inlet to air should not harm the pump or impair its efficiency. The pump should be resistant to changes in environmental temperatures, including freezing temperatures. The pump should pump a roughly linearly increasing volume at its speed is linearly increased. The pump should be durable and require little, if any, operator control other than turning the pump on and off. The pump should require little energy to operate. The pump should aerate as well as pump.

SUMMARY OF THE INVENTION

Two hollow perforated drums are in a spaced relationship to each other. An endless belt is tensioned between the two drums. At least a portion of the inside surface of the endless belt is made of a material or materials that will readily absorb and express liquids. One of the perforated drums is placed at least partially within the liquid to be pumped. The other drum is outside of the liquid. At least one of the drums will have a means for providing a powered rotational movement to the drum. As the drum rotates it causes the endless belt tensioned thereon to rotate as well. Ordinarily, frictional forces will be sufficient to rotate the belt. However, teeth, links, or the like can be provided if necessary to assure movement of the belt around the drum and to track the belt on the drum. The absorbing material on the underside of the belt in contact with the drum will necessarily be submerged within the liquid as it approaches and rotates around the drum that is at least partially submerged in the liquid. The tension maintained on the belt between the two drums compresses the absorbing material on the belt against the drum as it moves around the drum submerged in the liquid. As the belt moves away from the drum the absorbing materials ordinarily expand. At that point, it is still submerged within the liquid so the intersticial spaces in the absorbing belt are filled by the liquid to be absorbed. The belt then moves out of the liquid and continues to the drum positioned outside of the liquid. The air that is contained within the absorbing material is squeezed out of the absorbing material by the drum submerged within the liquid. This results in air going through the perforations in this drum and aerating the liquid in which the drum is submerged. As the belt approaches the drum placed outside of the liquid, again the absorbing material is compressed against the drum by the tension maintained between the two drums. This again compresses the absorbing material now expressing the liquid contained therein out of the material. The liquid passes through the perforations in the drum, then to be collected in a trough, gutter, or other collection device located within or below this perforated drum. This collection device can easily direct the liquid so removed to a tank, drain, or other desirable location. As the endless belt rotates completely around the drum, the absorbing material, having been squeezed dry, is exposed to the air. It expands taking air into the intersticial spaces where it remains as the belt continues to rotate. Expressing the liquid from the belt by the drum located outside of the liquid through the perforations in the drum and into a trough ordinarily will aerate this liquid as well. If the drums are rotated at a higher speed, then more absorbing material passes across the drum within the same time period, hence, more liquid is removed from the reservoir to the collection device. The only limitation in the amount of water that can be moved by this pump is the rate of absorption of the belt material used for that purpose. No close mechanical tolerances are required for the pump to operate. The pump will operate in water or other low viscosity liquids and can easily be adopted to operate by adsorption with high viscosity liquids. The pump is highly resistent to fouling by turbid, muddy, or other water having a high amount of particulate matter suspended therein. The pump does not require priming. If the water level falls below the drum that is usually partially submerged in the water, the pump is not harmed. Once the water level again rises to the point that the lower drum is partially submerged in the water, then the pump will again start to pump the water. The drums would ordinarily be made of a corrosion resistent material and would be highly resistant to wear. The belts would ordinarily be made of a durable absorbing material, but could easily be changed. Different belts could match desirable absorption properties to the particular liquid to be pumped. The change of the belts requires no particular operator expertise, and is far easier and less expensive than replacing internal parts in most mechanical pumps. This is a mechanical simple device. It is durable and functions well in harsh environments. It is highly resistant to changes in temperature. It not only moves but aerates liquids. It requires little energy to operate.

DETAILED DESCRIPTION OF THE DRAWINGS

Figure 1:
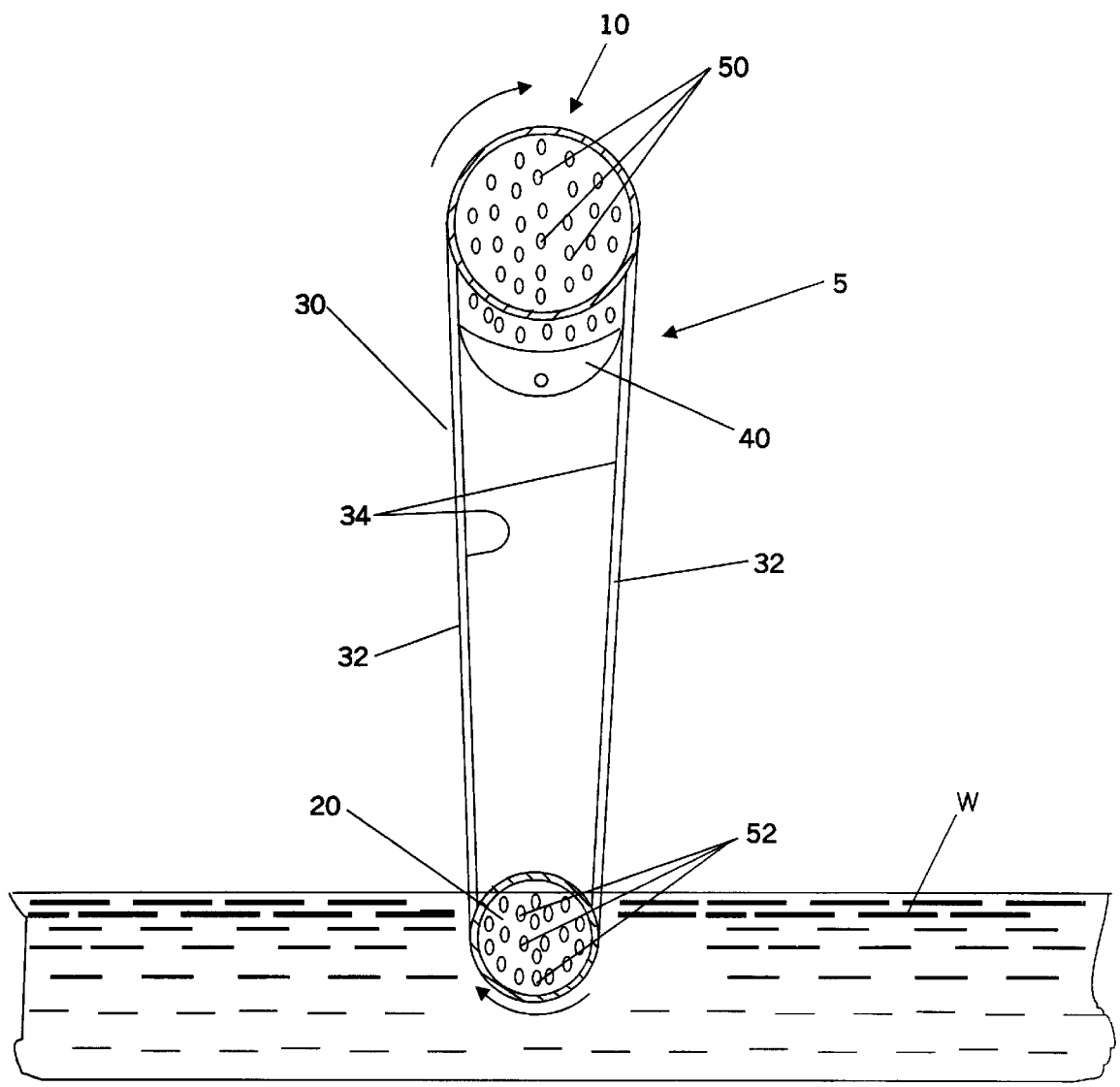
FIG. 1 shows a side cut-a-way view of the current invention.
Figure 4A:
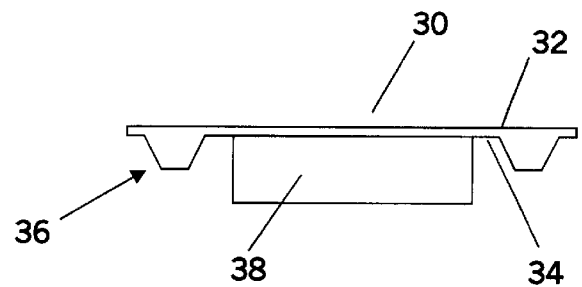
FIGS. 4A and 4B show a detailed view of a drum and belt of the current invention.

FIG. 1 shows the current invention of the absorbing belt pump (5) as seen from a side cut-a-way view. There is a cylindrically shaped dry drum (10) placed outside of the liquid (W) to be pumped. This dry drum (10) will ordinarily be constructed of a durable corrosion resistent material. Its size will vary depending on the need of the pump owner. Larger drums can pump more liquid. The surface of the dry drum (10) is perforated with a number of holes. A screen like surface probably works best. There is a second cylindrically shaped wet drum (20) which is ordinarily partially or fully submerged within in the liquid (W). The wet drum (20) is also constructed of a durable corrosion resistent material and is also perforated on its surface. There is an endless belt (30) constructed of an outside surface (32) and an inside surface (34). The outside surface (32) is ordinarily made of a durable, flexible, relatively inelastic material. On at least a portion of the inside surface (34) is a highly absorbent, compressible material (38) as shown in FIG. 4A. The inner surface (34) of the endless belt (30) is difficult to show from a side view. It is seen in detail in FIG. 4A. It is believed that various polyfoams would work best as the absorbent, compressible material (38) in this application although other materials, such as cotton or sponge, could also be used. Below the dry drum (10) is a collection pan (40). The endless belt (30) is tensioned between the dry drum (10) and the wet drum (20). A mechanical force is employed to rotate the dry drum (10). This causes the endless belt (30) to rotate around the dry drum (10) in a clockwise direction shown by the arrow. Because the endless belt (30) is tensioned on the dry drum (10) as the absorbent, compressible material (38) on the inner surface (34) of the endless belt (30) is pushed against the surface of the dry drum (10), it is compressed. Anything contained within the absorbent, compressible material (38) will be also compressed. Liquids are not compressible, therefore they must escape from the absorbent, compressible material (38). The dry drum (10) is perforated throughout its surface and is hollow. This results in any liquid that is absorbed with the absorbent, compressible material (38) on the inner surface (34) is squeezed through the holes in the surface of the dry drum (10). This is shown as a number of droplets (50) of the liquid (W). These may initially accumulate against the bottom surface of the dry drum (10), but ultimately the force of gravity, as well as centrifugal force caused by the rotation of the drum, will cause the liquid to pass through the holes or perforations in the dry drum (10) into the collection pan (40). For low viscosity liquids, a collection pan (40) should be approximately as wide as the distance between the two inner surfaces of the belt at the position the collection pan is placed. This assures that the droplets (50) will not pass between the edges of the collection pan and the endless belt (30). Where the dry drum (10) and the wet drum (20) are the same diameter, this means that the collection pan (40) will be slightly less in width than the diameter of the dry drum (10). In FIG. 1, the wet drum (20) is shown in a smaller diameter than the dry drum (10). In most applications, the diameters of the wet drum (10) and the dry drum (20) will be the same. The wet drum (20) is shown with a smaller diameter in FIG. 1 than the dry drum (10) to show that this does not affect the overall function of the device. Where a high viscosity liquid is being pumped and the dry drum (10) is rotating in a clockwise direction, as is shown in FIG. 1, the edge of the collection pan (40) in closest proximity to the three o'clock position of the dry drum (10) can be placed to lightly touch the inner surface (34) of the endless belt (30). This will have the effect of scraping any high viscosity liquids from the inner surface (34) of the endless belt (30) that may not have been expressed from the endless belt (30) by the operation of the dry drum (10). Other types of scraping devices could be employed. The endless belt (30) rotates clockwise and is in contact with the dry drum (10) from approximately a nine o'clock position on the dry drum (10) to approximately a three o'clock position on the dry drum (10). At the three o'clock position the endless belt (30) begins to lose contact with the surface of the dry drum (10). This allows the absorbent compressible material (38) on the inner surface (34) to expand. This expansion draws air into the inner spaces of the absorbent, compressible material (38) on the inner surface (34).

On the wet drum (20) the process of compression and consequent expression and expansion and consequent absorption is repeated but in reverse. The wet drum (20) is mounted for free rotation. Because the endless belt (30) is tensioned between the dry drum (10) and the wet drum (20) as the dry drum (10) rotates it advances the endless belt (30) which causes a corresponding rotation of the wet drum (20). As the inner surface (34) of the endless belt (30) approaches approximately a three o'clock position on the wet drum (20), the absorbent, compressible material (38) on the inner surface (34) is compressed forcing air from this material through the perforations. In the wet drum (20), the air ordinarily will form bubbles (52) which rise to the surface of the liquid (W). This results in aeration of the liquid (W). When the endless belt (30) has rotated to approximately a nine o'clock position on the wet drum (20) it begins to lose contact with the surface of the wet drum (20) and the absorbing material (38) on the inner surface (34) of the endless belt begins to expand and absorb the liquid (W). This portion of the inner surface (34) of endless belt (30) continues to move in an upward direction until it reaches the nine o'clock position of the dry drum (10) where the liquid is again squeezed from the absorbing material (38) on the inner surface of the belt (34). The expressed liquid collected in the collection pan (40) below the dry drum (10) and has been aerated as it was forced from the absorbing material on the inner surface (34) of the wet drum (20). The liquid in proximity to the wet drum (20) is also aerated by the bubbles (52) of air forced from the absorbing material on the inner surface (34) of the endless belt (30).

Figure 2:
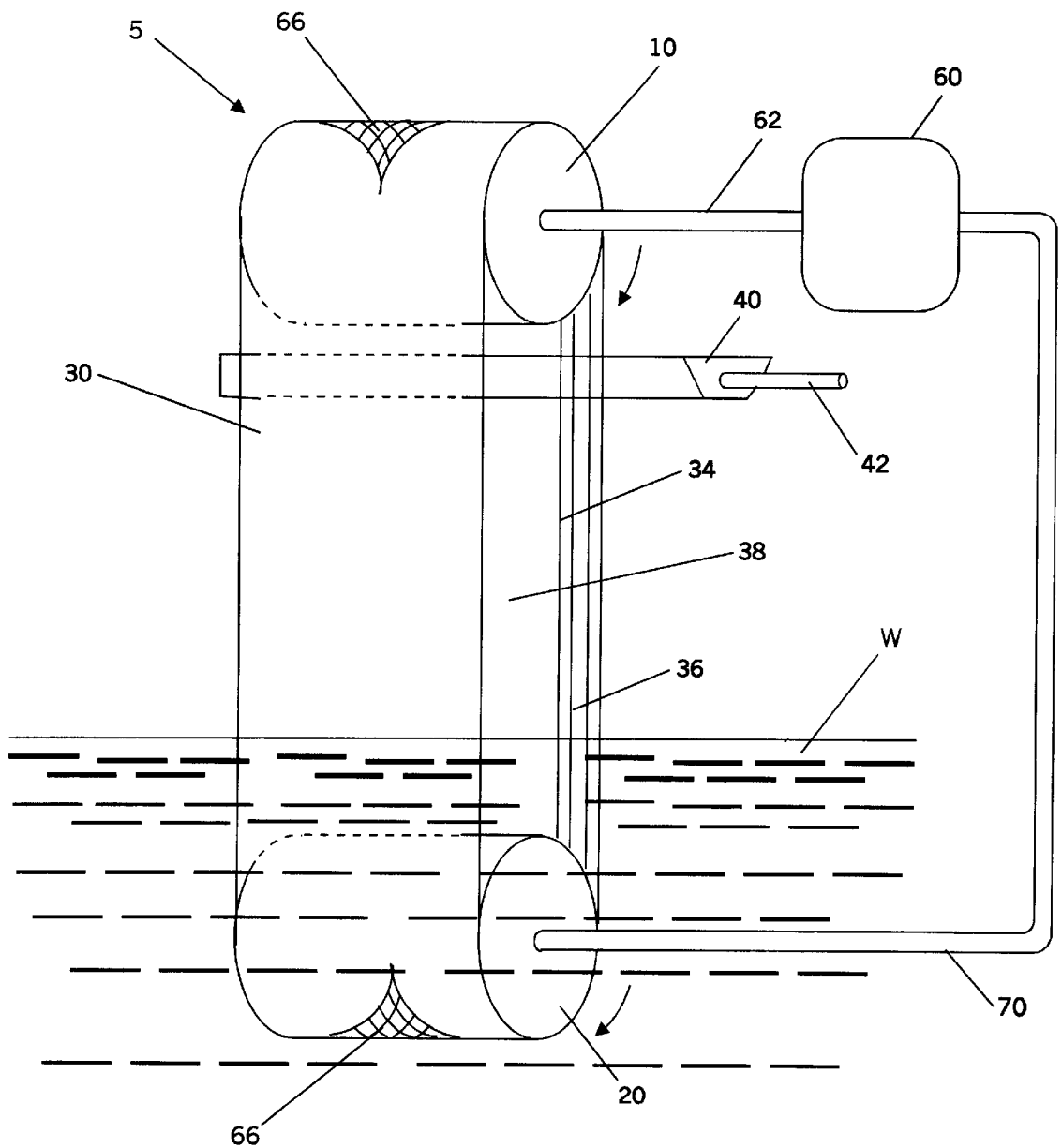
FIG. 2 shows a perspective view of the current invention.

FIG. 2 shows the absorbing belt pump (5) as seen from a side perspective view. Seen for the first time in the view is an electric motor (60). It is connected by a driving spindle (62) to the dry drum (10). The electric motor (60) rotates the driving spindle (62) in a clockwise direction which correspondingly rotates the dry drum (10) in a clockwise direction as indicated by the arrows. In many applications, an electric motor (60) will supply the rotational force to the dry drum (10) to operate the belt pump (5). However, other motor types, muscle power, a windmill, or a water wheel could be used to supply the necessary rotational power. Where the liquid (W) has a higher gravitational position than the ultimate location that liquid expressed from the dry drum (10) is to be transported to, then this gravitational potential could be exploited to provide the rotational force to operate the dry drum (10) hence, to make the belt pump (5) work. For example, spillways and the like are used to allow water accumulated behind a dam to feed a stream below the dam. Here the absorbing belt pump (5) could be placed in a reservoir of water at or near the top of the dam with a pipe leading from the collection pan (40) to the stream significantly below the belt pump (5). Once the belt pump was initially operated to provide a stream of water, the gravitational force pulling the water from its elevated position in the dam reservoir to the discharge stream below the dam face could be used to power a water wheel, generator, or the like, which could then supply the power to continue to operate the pump. In this fashion, the absorbing belt pump (5) would operate much like a siphon and could even, in some circumstances, generate power additional to that required to operate the pump. It is not anticipated that the absorbing belt pump (5) could be used as a power generating device, but it has that potential. Where the endless belt pump (5) is used in a stream, channel, or other application where the liquid (W) is moving, then paddle wheels could be used to harness the motion of the liquid (W) to provide the rotational force necessary to operate the pump. Because belt pump (5) is mechanically simple, requires little maintenance, or operator control, it may find wide application in areas without electric power where the rotational power for the dry drum (10) is by means other than an electric motor. An expandable arm (70) connects the wet drum (20) to a rigid framework which holds the electric motor (60). The expandable arm (70) may be a series of telescoping rods, could be spring mounted, or could have other means for adjusting, so that the spaced relationship between the dry drum (10) and the wet drum (20) could expand or contract as needed. The expanding arm (70) would be spring loaded or otherwise biased for pressure against the inner surface of the endless belt (30) as it rotates around the dry drum (10) driven by the rotating spindle (62) and the motor (60) and the wet drum (20). However, any arrangement that holds the dry drum (10) and the wet drum (20) in a tensioned relationship to each other is sufficient to allow operation of the pump. Tension is necessary to provide sufficient frictional force to cause the endless belt to rotate to perform its liquid transport function, and is necessary to provide sufficient compression for the absorbent, compressible material (38) on the inner surface (34) of the endless belt (30). Ordinarily, there would be no need to provide for a separate mode of power for the wet drum (20) so long as it would freely rotate in response to the motion of the endless belt (30). This could be accomplished simply by mounting it on roller bearings at the end of the expandable arm (70). Indeed, it is not even necessary for the wet drum (20) to be directly connected to the remaining apparatus that drives the dry drum (10) and provides support for the collection pan (40). If the wet drum (20) was made of sufficiently dense materials to provide the necessary tension on the endless belt (30) by the force of gravity, then it could accomplish the same frictional and compressive functions that are necessary for the operation of the absorbing belt pump (5). Also shown in FIG. 2 is the perforated surface (66) of both the wet drum (20) and the dry drum (10). The perforated surface (66) is shown beneath a cut-a-way portion of the endless belt (30). The perforated surface (66) is shown in more detail in FIG. 4B. The endless belt (30) is shown. The inner surface (34) of the endless belt (30) is seen, as is the absorbent, compressible material (38) mounted on the inner surface (34) of the endless belt (30). A ridge (36) is shown which is also part of the endless belt (30). These features are seen in more detail in FIG. 4A.

Figure 3:
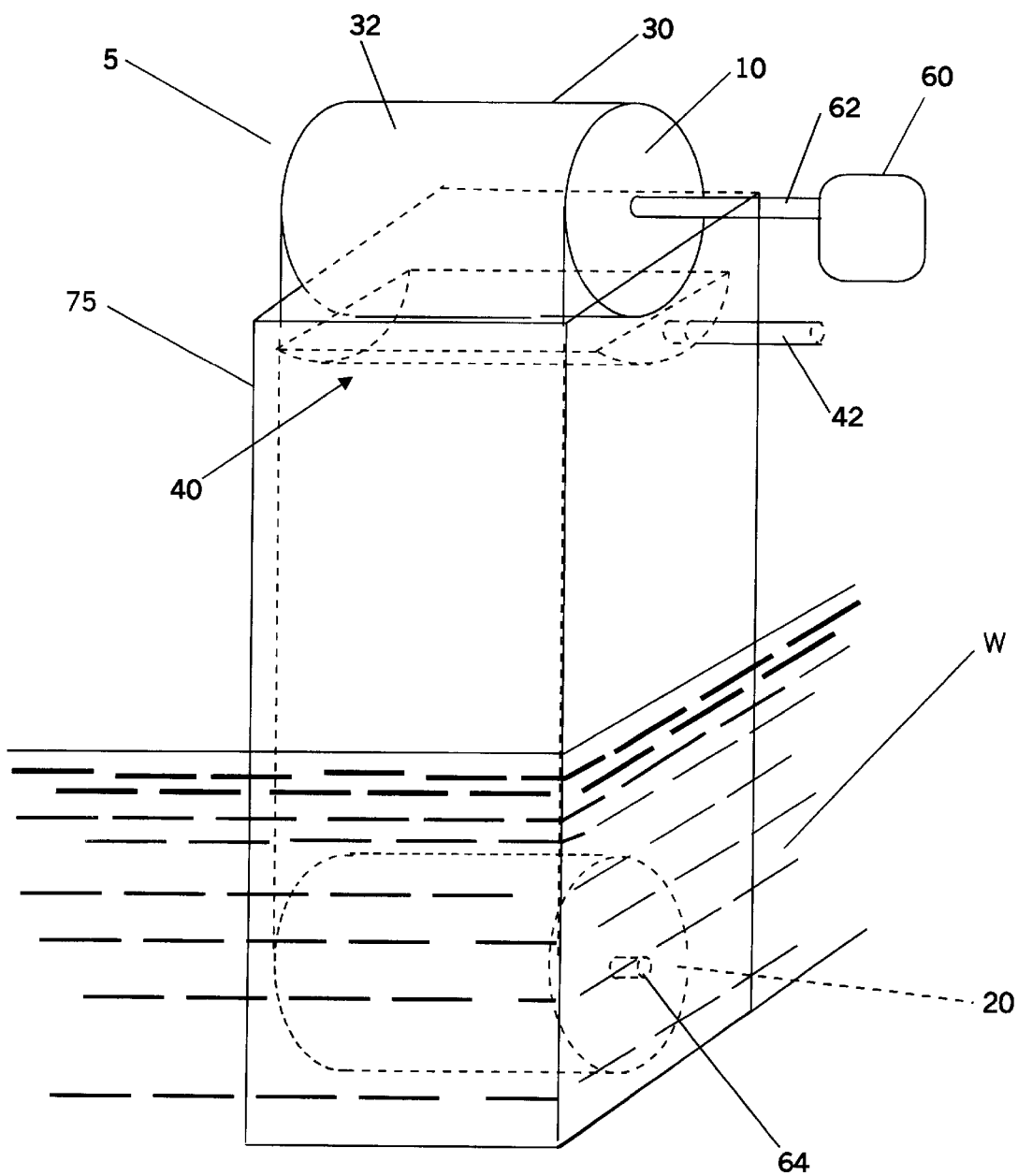
FIG. 3 shows an application of the current invention as used within a drain tile.

FIG. 3 shows the belt pump (5) as it might be used in a commercial application. The device could be used in a pre-existing shaft, well bore, drain tile, or the like. In FIG. 3 it is shown built into a terra cotta drain tile (75). This type of drain tile (75) is widely available and is quite inexpensive. This type of drain tile (75) as a casing for the belt pump (5) would be used in agricultural applications, aquacultural applications, or recreational applications like golf courses. One end of the drain tile (75) would be submerged below the level of the liquid to be pumped (W), ordinarily water. Completely submerged within the liquid and encased within the drain tile (75) is the wet drum (20). The wet drum (20) could be mounted for rotational movement by means of a axle (64) mounted into the drain tile (75). It need not be mounted for powered rotational movement. The outer surface (32) of the endless belt (30) is shown against the dry drum (10) which is also mounted within the sides of the drain tile (75), The rotational spindle (62) connects the dry drum (10) to the electric motor (60). Within the drain tile (75) is the collection pan (40) which has an outlet pipe (42) which directs the water pumped by the belt pump (5) to a desirable location. As shown in FIG. 3, the collection pan (40) is placed just below the dry drum (10). In order to reduce spillage, hence, to increase efficiency of the belt pump (5), the collection pan is ordinarily placed immediately below and as close as practical to the dry drum (10).

The drain tile (75) could be buried in a hole dug within the earth, and below the water table. Thus, the belt pump (5) could be used for drainage purposes to remove excess water from a field, golf course fairway, or the like. Or the drain tile (75) could be simply submerged in a stream or the like to move water from one location from the stream to a different location such as an irrigation ditch or the like. The drain tile (75) protects the dry drum (10), the wet drum (20), and the endless belt (30), to some degree, from the environment. For example, if used in a stream, then floating debris carried along by the force of the current in the stream could not contact or damage the endless belt (30) or the wet drum (20). Additionally, at the end of the drain tile (75) that is submerged in the liquid (W) a fine mesh or screen could be placed, which would protect the wet drum (20) and the endless belt (30) from aquatic life such as fish, turtles, or from submerged debris that could find its way into the bottom opening of the drain tile (75) that was not so equipped with the mesh or a screen.

Figure 4B:
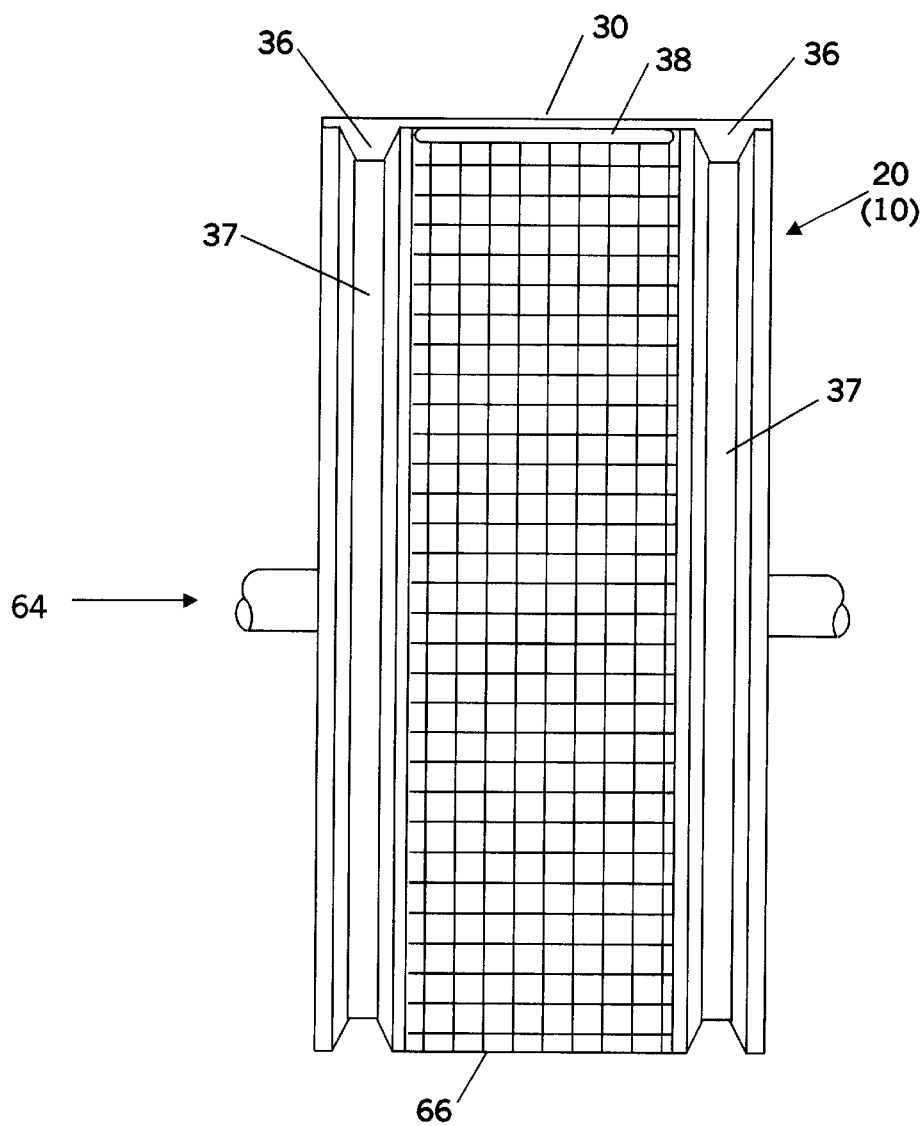

FIG. 4A and FIG. 4B shows in greater detail the design of either the wet drum (20) or the dry drum (10) and of the endless belt (30). Ordinarily, both the dry drum (10) and the wet drum (20) will be constructed identically. This simplifies construction and maintenance. In FIG. 4B, a drum is shown that can serve as an example of the wet drum (20) or a dry drum (10). FIG. 4A shows in a cut-a-way view the endless belt (30) which will have an outer surface (32) constructed of a durable, flexible material. It could be woven of impermeable material such as nylon or formed of material such as plastic or rubber. On the inner surface (34) of the endless belt (30) is an absorbing material (38). This ordinarily would be a polyfoam sponge or such similar compressible material which absorbs and expresses both liquid and air. At the edges of the endless belt (30) are ridges (36) which fit into appropriate grooves (37) on the surface of either the wet drum (20) or the dry drum (10). This serves to keep the endless belt (30) in place on the wet drum (20) and dry drum (10) as it rotates during functioning of the belt pump (5). This also reduces spillage of the liquid (W) as it is expressed from the endless belt (30) on the dry drum (10). This causes the absorbing material (38) to be forced against the perforated surface (66) of the wet drum (20). The wet drum (20) is mounted for rotational movement on an axle (64).

Shown in FIG. 4B is the design of the perforated surface (66) of the wet drum (20) which is quite important to the function of the device. The opening or the surface of the drum (20) must be sufficiently frequent so that, as much as possible, the entire surface of the compressible material (38) will be compressed when in the appropriate position on the wet drum (20). However, the openings on the perforated surface (66) of the wet drum (20) must not be so large as to leave a middle portion of the compressed surface within a single opening relatively uncompressed. If so, then those portions of the compressible surface (38) will not be compressed, hence will not release the liquid or air captured therein. It is believed that a screen or mesh like surface is best for most purposes. Seen at the 12 o'clock position of FIG. 4B is the endless belt (30) cut-a-way for a clearer view and shown compressed and in position against either the dry drum (10) or the wet drum (20). The absorbing material (38) is shown compressed against the perforated surface (66). The ridges (36) are fitted into the groves (37). If a highly viscus liquid is to be pumped, the perforated surface (66) will be a screen or mesh with relatively large opening which will work best. If a liquid with low viscosity is to be pumped, then a perforated surface (66) with smaller perforations will probably work best. The precise design on the perforations on the dry drum (10) and wet drum (20) can be adjusted to meet the needs of the operator of the system.

What is claimed is:

1. An endless belt pumping apparatus comprising:
   (a) a first drum, with at least a portion of a surface of said first drum perforated, positioned outside a liquid to be pumped;
   (b) a second drum, with at least a portion of a surface of said second drum perforated, positioned so at least part of said second drum is submerged in a liquid to be pumped;
   (c) an endless belt, with at least a portion of said endless belt made of compressible, absorbing material and with said endless belt passing around said perforated portion of said first drum and passing around said perforated portion of said second drum;
   (d) means for tensioning said endless belt between said first drum and said second drum, whereby said compressible, absorbing material of said endless belt is compressed against said perforated surface of said first drum and compressed against said perforated surface of said second drum;
   (e) means for said driving said endless belt around said first drum and around said second drum, whereby said compressible portion of said endless belt absorbs liquid when passing around said second drum and expresses said absorbed liquid when passing around said first drum;
   (f) means for collecting said absorbed liquid expressed from said endless belt as it passes around said first drum.

2. An endless belt pumping apparatus as recited in claim 1, wherein said means for collecting is a pan positioned below said first drum and above said liquid to be pumped.

3. An endless belt pumping apparatus as recited in claim 2, wherein said pan is slightly less in width than the diameter of said first drum.

4. An endless belt pumping apparatus as recited in claim 3, wherein an edge of said pan lightly touches an inner surface of said endless belt after said endless belt is no longer in contact with said perforated surface of said first drum, but before said endless belt reaches said perforated surface of said second drum.

5. An endless belt pumping apparatus as recited in claim 4, wherein said means for driving said endless belt is an electric motor attached to said first drum by a spindle.

6. An endless belt pumping apparatus as recited in claim 4, wherein said means for driving said endless belt is a paddle wheel partly immersed within a liquid to be pumped whereby movement of the liquid to be pumped rotates the paddle wheel and provides rotational movement for driving said endless belt.

7. An endless belt pumping apparatus as recited in claim 6, wherein said endless belt pumping apparatus is contained within a housing.

8. An endless belt pumping apparatus as recited in claim 7, wherein said means for tensioning said endless belt is an expandable arm within said housing connecting said first drum to said second drum.

9. An endless belt pumping apparatus as recited in claim 8, wherein said portion of said perforated surface of said first drum and said portion of said perforated surface of said second drum is constructed of screen like material.

10. An endless belt pumping apparatus as recited in claim 9, wherein said first drum and said second drum are identical to each other.

11. An endless belt pumping apparatus as recited in claim 10, wherein said endless belt has an outside surface and an inside surface whereby on said inside surface at a first edge of said inside surface is a first ridge and at a second edge of said inside surface is a second ridge and said compressible, absorbing material is positioned between said first and second ridges and whereby said first drum and said second drum have grooves positioned to receive said first and second ridges on said inside surface of said endless belt as said endless belt is driven around said first drum and around said second drum.

12. An endless belt pumping apparatus as recited in claim 11, wherein said means for tensioning said endless belt is constructing said second drum of materials denser than the density of said liquid to be pumped whereby the force of gravity provides means for tensioning said endless belt between said first drum and said second drum.

13. An endless belt pumping apparatus comprising:
(a) a first drum, with at least a portion of a surface of said first drum perforated, positioned outside a liquid to be pumped;
(b) a second drum, with at least a portion of a surface of said second drum perforated, positioned so at least part of said second drum is submerged in a liquid to be pumped;
(c) an endless belt, with at least a portion of said endless belt made of compressible, absorbing material and with said endless belt passing around said perforated portion of said first drum and passing around said perforated portion of said second drum;
(d) means for tensioning said endless belt between said first drum and said second drum, whereby said compressible, absorbing material of said endless belt is compressed against said perforated surface of said first drum and compressed against said perforated surface of said second drum;
(e) means for said driving said endless belt around said first drum and around said second drum, whereby said compressible portion of said endless belt absorbs liquid when passing around said second drum and expresses said absorbed liquid when passing around said first drum;
(f) means for collecting said absorbed liquid expressed from said endless belt as it passes around said first drum.
(g) means for aerating said absorbed liquid and means for aerating liquid in which a portion of said second drum is submerged.

14. An endless belt pumping apparatus as recited in claim 13, wherein said means for collecting is a pan positioned below said first drum and above said liquid to be pumped and said pan is slightly less in width than the diameter of said first drum.

15. An endless belt pumping apparatus as recited in claim 14, wherein an edge of said pan lightly touches an inner surface of said endless belt after said endless belt is no longer in contact with said perforated surface of said first drum, but before said endless belt reaches said perforated surface of said second drum.

16. An endless belt pumping apparatus as recited in claim 15, wherein said means for driving said endless belt is an electric motor attached to said first drum by a spindle.

17. An endless belt pumping apparatus as recited in claim 15, wherein said means for driving said endless belt is a paddle wheel partly immersed within a liquid to be pumped whereby movement of the liquid to be pumped rotates the paddle wheel and provides rotational movement for driving said endless belt.

18. An endless belt pumping apparatus as recited in claim 17, wherein said endless belt pumping apparatus is contained within a housing.

19. An endless belt pumping apparatus as recited in claim 18, wherein said endless belt has an outside surface and an inside surface whereby on said inside surface at a first edge of said inside surface is a first ridge and at a second ridge of said inside surface is a second ridge and said absorbent, compressible material is positioned between said first and second ridges and whereby said first drum and said second drum have grooves positioned to receive said first and second ridges on said inside surface of said endless belt as said endless belt is driven around said first drum and around said second drum.

20. An endless belt pumping apparatus as recited in claim 19, wherein said means for tensioning said endless belt is constructing said second drum of materials denser than the density of said liquid to be pumped whereby the force of gravity provides means for tensioning said endless belt between said first drum and said second drum.

* * * * *